United States Patent Office 3,217,598
Patented Nov. 16, 1965

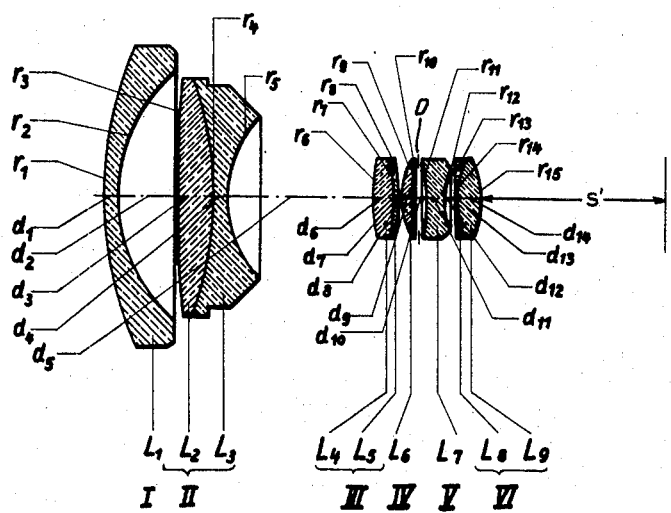

3,217,598
WIDE-ANGLE OBJECTIVE
Rudolf Solisch, Gottingen, and Walter Wöltche, Bad Kreuznach, Germany, assignors to Isco Optische Werke G.m.b.H., Gottingen-Weende, Germany, a company of Germany
Filed Apr. 18, 1962, Ser. No. 188,331
Claims priority, application Germany, May 9, 1961,
J 19,887
2 Claims. (Cl. 88—57)

Our present invention relates to a wide-angle objective system of the general type disclosed in commonly assigned U.S. Patent No. 878,724, issued March 24, 1959 to Rudolf Solisch. This objective is characterized, inter alia by an asymmetrical structure including six air-spaced members, the air space separating the second and third members (as seen from the side of the longer light rays) having a length exceeding the overall focal length of the system.

The objective system of the above patent performs well for angles of view up to about 80° and relative apertures as high as 1:3, although for aperture ratios better than 1:4 certain aberrations begin to be noticeable. It is, therefore, the general object of our invention to provide an improved system of this type in which these aberrations are more effectively suppressed without any reduction in the angle of view.

We have found, in accordance with the instant invention, that the above object can be realized if, in contradistinction to the system disclosed and claimed in the aforementioned patent, not only the second member (forwardly of the large air space) but also the third and sixth members (to the rear thereof) are in the form of doublets and if their cemented surfaces satisfy certain specific requirements as to their relative refractive powers.

The soblute refractive power of a cemented surface of radius $r$, located between a first medium of refractive index $n_d$ forwardly of this surface and a second medium of refractive index $n_d'$ to the rear thereof, is conventionally expressed as $$P = (n_d' - n_d)/r$$

with $r$ given in meters. The relative power, based upon a value of unity for the overall focal length $f'$ of the system, is obtained if $r$ is replaced in the above formula by $R = r/f'$. In the system according to our invention the absolute value of this relative power should be of the order of 0.1 for the three cemented surfaces referred to, the middle one being of negative and the others of positive sign; more specifically, we prefer to establish the values for these powers in the second, third and sixth members within the ranges of $+0.08$ to $+0.15$, $-0.07$ to $-0.14$ and $+0.11$ to $+0.21$, respectively.

The increase in the refractive power of the cemented surface of the second member, compared with that of the previously patented system, has been found highly advantageous for the purpose of reducing distortion, whereas the dispersive inner surface now provided in the third member effects a flattening of the projected image; the cemented surface in the sixth member helps correct for comatic aberrations due to the upper coma rays and for astigmatism.

According to a further feature of our invention, designed to remedy entrance-pupil and asymmetric aberrations, we prefer to construct the fourth and fifth members of our system as a collective meniscus and as a biconcave lens, respectively, the latter being asymmetrical in that its forward face is less strongly curved than its rear face; this biconcave lens advantageously has an axial thickness greater than 10% of the overall focal length $f'$.

The sole figure of the accompanying drawing shows a preferred embodiment of our invention.

The system shown in the drawing comprises a front group of members I, II and a rear group of members III, IV, V, VI on opposite sides of a large air space $d_5$. Member I is a single negative meniscus $L_1$, with radii $r_1$, $r_2$ and the thickness $d_1$, and is separated by an air space $d_2$ from member II which is a meniscus-shaped doublet composed of a positive lens $L_2$ (radii $r_3$, $r_4$ and thickness $d_3$) and a negative lens $L_3$, (radii $r_4$, $r_5$ and thickness $d_4$). Member III is another, biconvex doublet whose component elements are a positive lens $L_4$ (radii $r_6$, $r_7$ and thickness $d_6$) and a negative lens $L_5$ (radii $r_7$, $r_8$ and thickness $d_7$). Member IV, separated from member III by a small air space $d_9$, is a single meniscus-shaped collective lens $L_6$ with radii $r_9$, $r_{10}$ and thickness $d_9$. Member V, separated from member IV by another small air space $d_{10}$ containing a diaphragm D, is an asymmetrically biconcave single lens $L_7$ with radii $r_{11}$, $r_{12}$ and thickness $d_{11}$. The final member VI, which follows member V with a spacing $d_{12}$, is a biconvex third doublet composed of a negative lens $L_8$ (radii $r_{13}$, $r_{14}$ and thickness $d_{13}$) and a positive lens $L_9$ (radii $r_{14}$, $r_{15}$ and thickness $d_{14}$).

Representative numerical values of radii $r_1$ to $r_{15}$ and $d_1$ to $d_{14}$, based upon a numerical value of unity for the overall focal length $f'$ (whose actual length may be taken, by way of example, as 100 mm.), are given in the following table which also shows the refractive indices $n_d$ and the Abbé numbers $\nu$ of lenses $L_1$ to $L_9$. The system represented by the table has a back-focal lengths $s'$ of 1.4369 and a field angle of 80°.

Table

| | | | $n_d$ | $\nu$ |
|---|---|---|---|---|
| I { $L_1$ | $r_1 = +2.6099$ | $d_1 = 0.1164$ | 1.5014 | 56.5 |
|  | $r_2 = +1.1903$ | $d_2 = 0.4384$ | Air space | |
| II { $L_2$ | $r_3 = +8.9468$ | $d_3 = 0.2716$ | 1.8052 | 25.5 |
| { $L_3$ | $r_4 = -3.0154$ | $d_4 = 0.1164$ | 1.4463 | 67.3 |
|  | $r_5 = +0.8543$ | $d_5 = 1.1251$ | Air space | |
| III { $L_4$ | $r_6 = +1.3277$ | $d_6 = 0.1552$ | 1.6385 | 55.5 |
| { $L_5$ | $r_7 = -0.9506$ | $d_7 = 0.0388$ | 1.7408 | 28.1 |
|  | $r_8 = -3.4224$ | $d_8 = 0.0039$ | Air space | |
| IV { $L_6$ | $r_9 = +0.6728$ | $d_9 = 0.1048$ | 1.5673 | 42.8 |
|  | $r_{10} = +2.1657$ | $d_{10} = 0.0854$ | Diaphragm space | |
| V { $L_7$ | $r_{11} = -3.1116$ | $d_{11} = 0.1552$ | 1.8052 | 25.5 |
|  | $r_{12} = +0.6464$ | $d_{12} = 0.0660$ | Air space | |
| VI { $L_8$ | $r_{13} = +6.6224$ | $d_{13} = 0.0310$ | 1.6200 | 36.3 |
| { $L_9$ | $r_{14} = +0.7162$ | $d_{14} = 0.1785$ | 1.7363 | 32.1 |
|  | $r_{15} = -0.8590$ | | | |
|  | | $d_{total} = 2.8867$ | | |

The relative powers of the three cemented surfaces $r_4$, $r_7$ and $r_{14}$ can be calculated from the foregoing table as having the values of $+0.119$, $-0.108$ and $+0.162$, respectively; it will thus be seen that the power of surface $r_4$ ranges between the limits of $+0.08$ and $+0.15$, that of surface $r_7$ falls within the range of $-0.07$ to $=0.14$, and that of surface $r_{14}$ lies between the values of $+0.11$ and $+0.21$. The axial thickness $d_{11}$ of lens $L_7$, i.e., member V, exceeds one-tenth of the focal length $f'$; the forward face of this singlet, with its relatively large radius $r_{11}$, is less strongly curved than its rear face with the relatively small radius $r_{12}$.

We claim:

1. An objective system comprising six air-spaced members including a negative first member constituted by a single meniscus-shaped lens, a meniscus-shaped negative second member consisting of two lenses of opposite refractivity cemented together, a biconvex positive third member consisting of two lenses of opposite refractivity cemented together, a positive fourth member constituted by a single meniscus-shaped lens, a negative fifth member constituted by a single biconcave lens, and a biconvex positive sixth member consisting of two lenses of opposite refractivity cemented together, said second and third members being separated from each other by an air space of an axial length exceeding the overall focal length of the system, the cemented surfaces between the lenses of said second, third and sixth members having refractive powers whose relative values, based upon a numerical value of unity for said overall focal length, lie within the ranges of substantially $+0.08$ to $+0.15$, $-0.07$ to $-0.14$, and $+0.11$ to $0.21$, respectively, said biconcave lens having a less strongly curved concave face turned toward said fourth member and a more strongly curved concave face turned toward said sixth member, said biconcave lens having an axial thickness greater than 10% of said overall focal length.

2. A system according to claim 1 wherein the radii $r_1$ to $r_{15}$, the thickness and separations $d_1$ to $d_{14}$, the refractive indices $n_d$ and the Abbé numbers $\nu$ of all of said lenses $L_1$ to $L_9$ have numerical values substantially as given in the following table:

Table

|   |     |                   |                 | $n_d$ | $\nu$ |
|---|-----|-------------------|-----------------|-------|------|
| I | $L_1$ | $r_1 = +2.6099$   | $d_1 = 0.1164$  | 1.5014 | 56.5 |
|   |     | $r_2 = +1.1903$   | $d_2 = 0.4384$  | Air space | |
| II | $L_2$ | $r_3 = +8.9468$  | $d_3 = 0.2716$  | 1.8052 | 25.5 |
|   | $L_3$ | $r_4 = -3.0154$  | $d_4 = 0.1164$  | 1.4463 | 67.3 |
|   |     | $r_5 = +0.8543$   | $d_5 = 1.1251$  | Air space | |
| III | $L_4$ | $r_6 = +1.3277$ | $d_6 = 0.1552$  | 1.6385 | 55.5 |
|   | $L_5$ | $r_7 = -0.9506$  | $d_7 = 0.0388$  | 1.7408 | 28.1 |
|   |     | $r_8 = -3.4224$   | $d_8 = 0.0039$  | Air space | |
| IV | $L_6$ | $r_9 = +0.6728$  | $d_9 = 0.1048$  | 1.5673 | 42.8 |
|   |     | $r_{10} = +2.1657$ | $d_{10} = 0.0854$ | Air space | |
| V | $L_7$ | $r_{11} = -3.1116$ | $d_{11} = 0.1552$ | 1.8052 | 25.5 |
|   |     | $r_{12} = +0.6464$ | $d_{12} = 0.0660$ | Air space | |
| VI | $L_8$ | $r_{13} = +6.6224$ | $d_{13} = 0.0310$ | 1.6200 | 36.3 |
|   | $L_9$ | $r_{14} = +0.7162$ | $d_{14} = 0.1785$ | 1.7363 | 32.1 |
|   |     | $r_{15} = -0.8590$ |  |  | |

References Cited by the Examiner

UNITED STATES PATENTS 2,844,997 7/1958 Lange _____ 88—57
2,878,724 3/1959 Solisch _____ 88—57
3,038,379 6/1962 Albrecht _____ 88—57

FOREIGN PATENTS 1,145,025 4/1957 France.
1,265,426 5/1961 France.

JEWELL H. PEDERSEN, *Primary Examiner.*